WALTER C. GIFFORD.

Improvement in Stanchions.

No. 4,353. Reissued April 25, 1871.

Witnesses:

Solon C. Lemon

Thos. D. D. Durand

Inventor:

Walter C. Gifford

Per Munn & Co

Attorneys.

AM. PHOTO-LITHOGRAPHIC CO. N.Y. (OSBORNE'S PROCESS.)

United States Patent Office.

WALTER C. GIFFORD, OF JAMESTOWN, NEW YORK.

Letters Patent No. 105,445, dated July 19, 1870; reissue No. 4,353, dated April 25, 1871.

IMPROVEMENT IN STANCHIONS.

The Schedule referred to in these Letters Patent and making part of the same.

*To all whom it may concern:*

Be it known that I, WALTER C. GIFFORD, of Jamestown, in the county of Chautauqua and State of New York, have invented a new and useful Improvement in Swinging Stanchions; and I do hereby declare that the following is a full, clear, and exact description thereof, which will enable others skilled in the art to make and use the same, reference being had to the accompanying drawing forming part of this specification.

My invention relates to cattle-stanchions, and consists in the following improvements thereon:

First, in a new way of automatically locking the movable stanchion-bar with pins or blocks, as hereinafter described.

Secondly, in a "new way" of unlocking, raising, and opening the loose movable stanchion-bar, as hereinafter specified.

Thirdly, in a new way of preventing the feed from getting under the stanchion from the manger, as hereinafter set forth.

In the accompanying drawing—

Similar letters of reference indicate corresponding parts.

Figure 1:
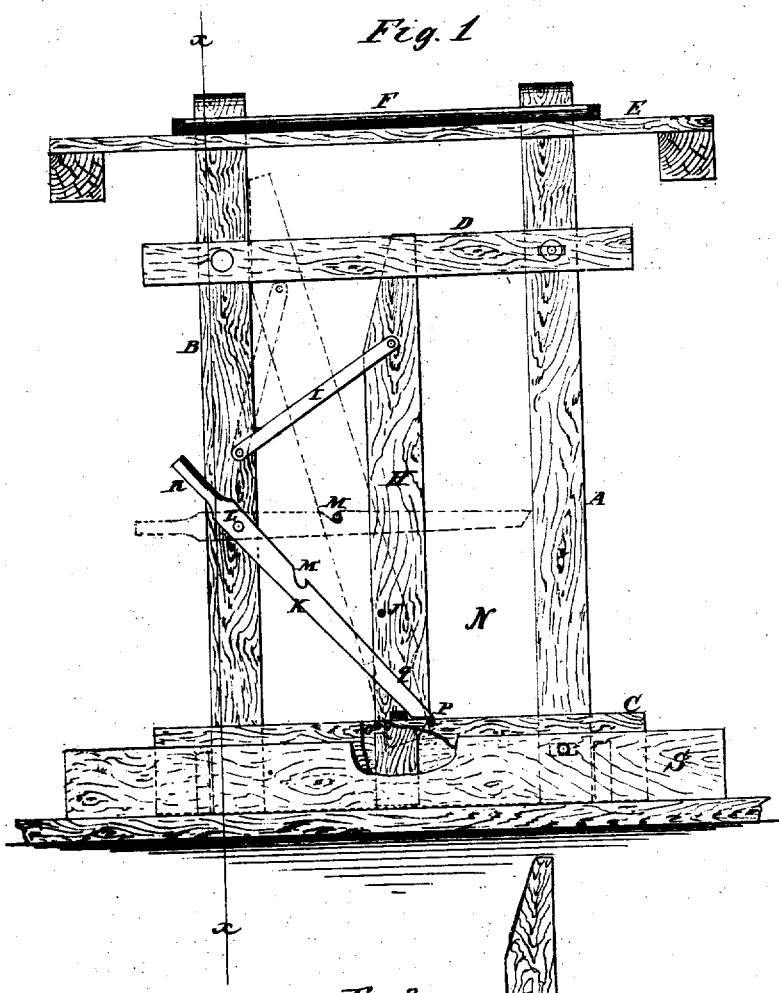
Figure 1 is a front elevation of the arrangement.
Figure 2:
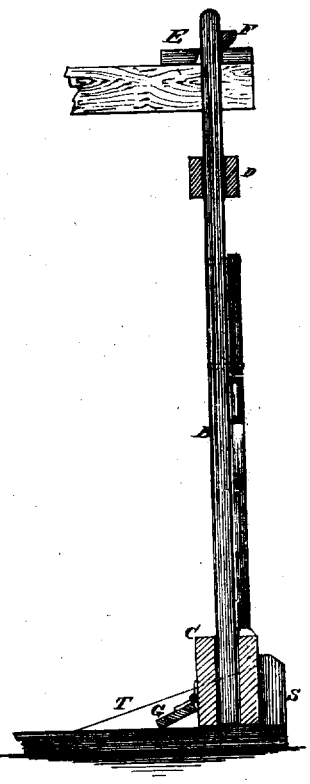
Figure 2 is a vertical section of fig. 1, on the line *x x*.
Figure 3:
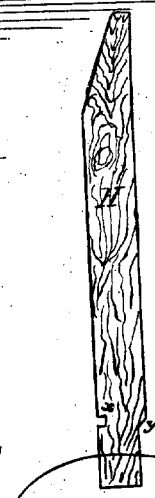
Figure 3 is a side elevation of the adjustable stanchion H.

A B are upright stanchions tied or fastened together by double transverse bars at their lower ends, as seen at C, and also near their upper ends, as seen at D.

An upright frame, rectangular in form, is thus made, which may be either fixed in position or made to swing back and forth, as may be desired.

In this example of my invention the frame is suspended from the horizontal timber E by means of the bar F, to which the ends of the stanchions A B are attached.

These ends pass up through mortises in E, and the bar F rests on E, and thereby supports the frame.

G is a scraper, hinged to the lower end of the frame to prevent the feed of the animals from getting under the frame from the manger.

H is an adjustable stanchion, which is connected with the upright bar B by the rod I. This rod is pivoted to B and to H.

J is a pin, which projects from the side of the stanchion H.

K is a lever, which is pivoted to B, as seen at L.

M is a notch in the lever, which engages with the pin J.

As seen in the drawing the stanchion H is closed, as when the neck of the animal is confined in the space N.

There is a notch in the stanchion H, which engages with a pin in the frame, as seen at O.

The pressure of the animal's neck against the stanchion H serves to keep the stanchion in place.

There is a pin in the frame, as seen at P, and a rebatement and incline on the stanchion, as seen in dotted line at *q*, which, as the stanchion descends, serve to throw the stanchion in the opposite direction and catch it onto the pin, as seen at O.

To raise the stanchion for releasing the animal the end R of the lever K is pressed down, by which the stanchion H, lever K, and connecting-rod I are thrown into the position seen in dotted lines.

The notch M engages with the pin J, which holds the stanchion, as seen.

S is a base-board, against which the swinging frame closes.

The movement in the other direction is limited by pins in the floor, brackets T, or in any other suitable manner.

The transverse pieces C and D are double, leaving a space between them, in which the stanchion H works.

The swinging movement allowed the stanchion makes it self-adjusting to the neck of the animal in all the positions which the animal may occupy.

The advantages of this arrangement are: it requires no chain, rings, or iron hooks; it is simple and cheap; and may be constructed by any one at all acquainted with the use of tools.

The upright stanchion A is slotted horizontally where the transverse bars C and D are fastened, so that it can be adjusted laterally to fit the necks of different-sized animals.

Having thus described my invention,

I claim as new and desire to secure by Letters Patent—

1. A swinging stanchion-bar, H, having notch *x* on one side and incline *y* on the other, acting in combination with the pins O P to form an automatic lock, as described.

2. The arrangement of notched lever K *m*, pivoted at L, in combination with a pin, J, for the purpose of unlocking, raising, and opening, in the manner described.

3. The arrangement of the hinged scraper G upon the swinging stanchion, as and for the purpose described.

W. C. GIFFORD.

Witnesses:
CHAS. A. PETTIT,
T. P. SIMPSON.